United States Patent
Olshansky et al.

(10) Patent No.: US 8,804,717 B2
(45) Date of Patent: Aug. 12, 2014

(54) SERIAL REDIRECTOR DEVICE AND ASSOCIATED METHODS

(75) Inventors: Vadim Olshansky, Tarzana, CA (US); Allen Martin Swig, Moorpark, CA (US)

(73) Assignee: Nomadix, Inc., Agoura Hills, CA (US)

( * ) Notice: Subject to any disclaimer, the term of this patent is extended or adjusted under 35 U.S.C. 154(b) by 57 days.

(21) Appl. No.: 13/481,060

(22) Filed: May 25, 2012

(65) Prior Publication Data
US 2012/0300788 A1    Nov. 29, 2012

Related U.S. Application Data

(60) Provisional application No. 61/491,022, filed on May 27, 2011.

(51) Int. Cl.
*H04L 12/28*    (2006.01)

(52) U.S. Cl.
USPC .......................................... 370/389; 370/412

(58) Field of Classification Search
USPC ......................................... 370/413, 389, 412
See application file for complete search history.

(56) References Cited

U.S. PATENT DOCUMENTS

2005/0234982 A1 * 10/2005 Yamamoto et al. ........ 707/104.1
2010/0332615 A1 * 12/2010 Short et al. .................... 709/217

FOREIGN PATENT DOCUMENTS

CA    2 454 968    2/2003

OTHER PUBLICATIONS

International Search Report and Written Opinion dated Oct. 4, 2012 in PCT/US12/039712.

* cited by examiner

*Primary Examiner* — Sai-Ming Chan
(74) *Attorney, Agent, or Firm* — Knobbe Martens Olson & Bear LLP

(57) ABSTRACT

Systems and methods for a serial redirector device to provide services using serial communication redirection through a packet-based interface. In one implementation, the serial redirector device is configured to receive messages via a packet-based interface and redirect the same to a device in serial communication with the serial redirector device. The serial redirector mediates the communication between serially connected devices and devices connected via packet-based interfaces.

22 Claims, 7 Drawing Sheets

SERIAL REDIRECTOR DEVICE AND ASSOCIATED METHODS

CROSS-REFERENCE TO RELATED APPLICATIONS

This application claims priority from U.S. Provisional Patent Application No. 61/491,022, entitled "SERIAL REDIRECTOR DEVICE AND ASSOCIATED METHODS," filed May 27, 2011, which is incorporated by reference in its entirety.

FIELD

The present disclosure generally relates to a serial redirector device and, more particularly, to a serial redirector device configured to intelligently redirect communications between a serial interface and a packet-based interface.

BACKGROUND

In order to connect the computer of a user/subscriber to one or more networks or other online services, a variety of gateway devices have been developed. For example, one advantageous gateway device is described by U.S. Pat. No. 6,130,892, the contents of which are incorporated herein by reference. The gateway device can serve as a gateway to the Internet, an enterprise network, on-line services, or other networks. In addition to serving as a gateway, the gateway device can automatically adapt to the protocols and other parameters utilized by the host computer, in order that the host computer can communicate with the network in a manner that is transparent both to the user/subscriber and the network. Once appropriately connected to the gateway device, the computer can communicate via the network, such as the network at a hotel, at home, at an airport, or any other location, in order to access other networks, such as the enterprise network, or other online services, such as the Internet. In this fashion, the gateway device is capable of providing network access and network maintenance to the user/subscriber and the network operator. Accordingly, gateway devices can communicate with a variety of external devices.

In view of the variety of devices that can be connected with the gateway device and the variety of communication links that can be used, improvements to the gateway device are desirable.

SUMMARY

Details of implementations of the subject matter described in this specification are set forth herein. Other features, aspects, and advantages will become apparent from the description, the drawings, and the claims.

In one aspect of the disclosure, a method of providing services is provided. The method can be performed at a serial redirector which is in communication with a serially connected peer and a second peer connected via a packet-based interface. The method can include receiving a message from a second peer destined for the serially connected peer via a network communication interface. The method can further include processing the message where processing the message includes preparing the message for serial transmission. The method can further include transmitting the processed message to the serially connected peer via a serial communication interface.

In another aspect, a method of providing services is provided. The method can be performed at a gateway device configured to provide users with network access or a stand alone serial redirector device. The device can be in communication with a billing and content server and with a hotel property management system. In an embodiment, the device can receive a message from the billing and content server destined for the hotel property management system for a network communication interface. The device can further process the message by preparing the message for serial transmission. The device can further include transmit the processed message to the hotel property management system via a serial communication interface.

In yet another aspect, a method of providing services is provided. The method can be performed at a serial redirector device or gateway device configured to provide users with network access. The device can be in communication with a billing and content server and with a hotel property management system. The method can include receiving a message from the hotel property management system destined for the billing and content server for via a serial communication interface. The method can further include processing the message wherein processing the message includes preparing the message for network transmission. The method can further include transmitting the processed message to billing and content server via a network communication interface.

DETAILED DESCRIPTION

As discussed above, communications with external devices can be limited due to the particular transport the external devices are configured to use for transmitting and receiving information. Serial redirectors provide a capability to redirect application data between two peers where the first peer has a serial (e.g., RS232) interface and the second peer has a packet-based interface including, for example, an ISO-OSI-inspired communication stack (e.g., TCP/UDP/SCTP over IP). In some implementations the packet-based interface can be a packet-switched interface. In some implementations, such as those featuring an n-tier architecture, a large number of serial redirectors can be connected to a relatively small number of centrally located second peers. While this deployment has the benefit of centralizing control of higher-level tiers (e.g., presentation, application), where the first peer connects using a serial redirector, each peer maintains its own connection with the second peer. Accordingly, the second peer concurrently manages potentially thousands of concurrent connections, at least one per first peer. Furthermore, the first peers can not all be actively using the communication channel. Thus, the second peer expends system resources maintaining connections to numerous idle serial directors. This can introduce complexity and/or unnecessary cost to the system. In addition, the nature of communication via serial redirectors precludes the second peer from being virtually hosted, which can raise operating costs of the system. Still further, as companies begin hosting second peer applications with computing vendors (e.g., cloud computing), certain vendors restrict the communication channels accessible by clients. For example, Google may have a policy forbidding an application to open raw TCP/IP sockets to or from applications it hosts. Additionally, both the first and second peers can need to use custom network configurations (e.g., TCP port numbers) to communicate serially. These custom network configurations can result in the communications being blocked by firewalls or other network security components. In this situation, the network can need to be specially configured to enable communication between the first and second peers.

The present disclosure describes a serial redirector system. As used herein, the term serial redirector generally refers to a device that serves as an intelligent bridge between an interface, such as a serial interface, and a packet-based interface for managing the transmissions from the packet-based interface to the serial interface and from the serial interface to the packet-based interface. A serial redirector can be a standalone device. A serial redirector can also be included in other devices such as a gateway device. This approach can significantly simplify the implementation of communication-related aspects of the second peer, improve scalability of the second peer, and decrease operating costs.

Figure 1:
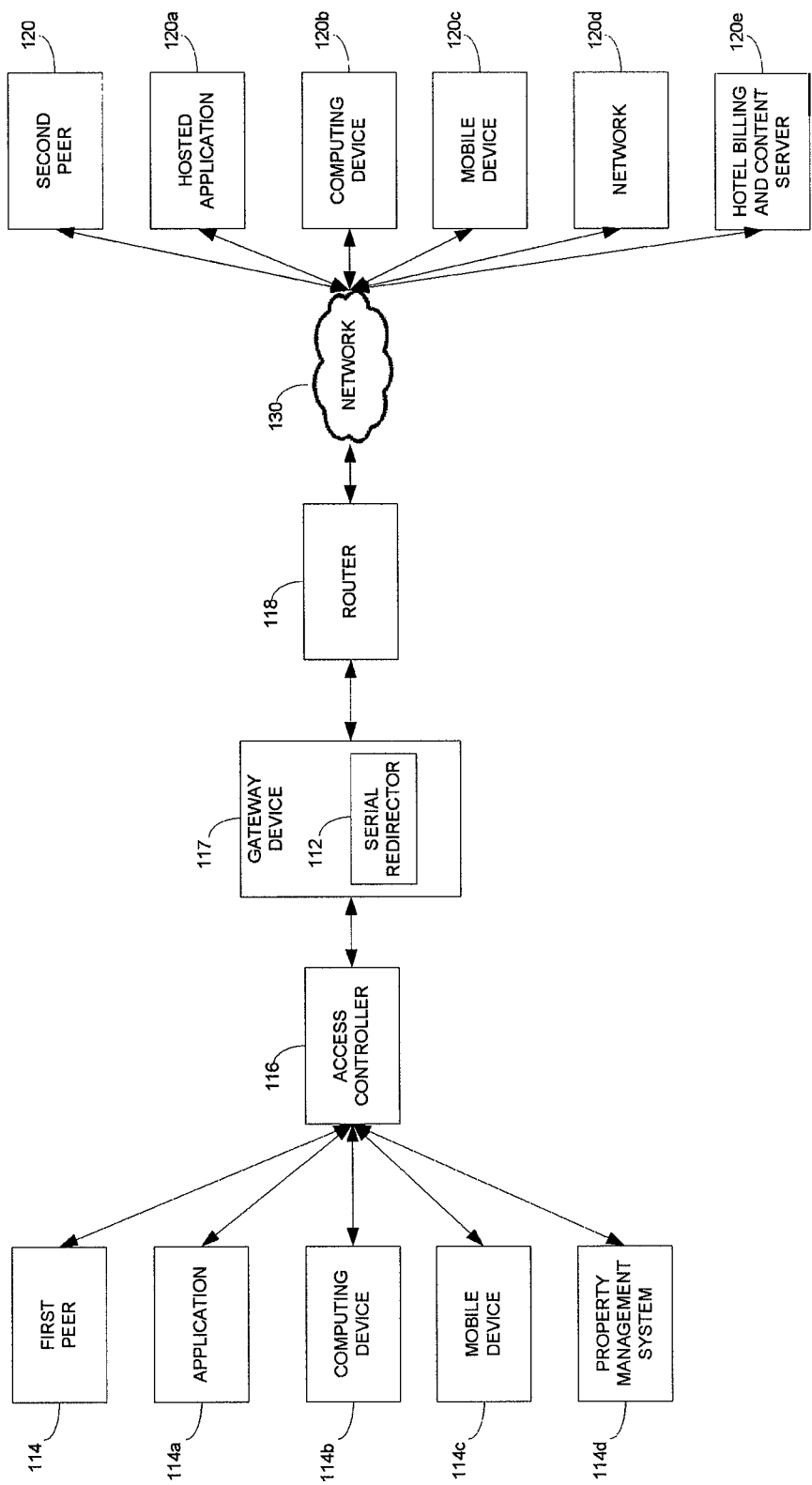
FIG. 1 is a block diagram of an example of a communications network incorporating a gateway device that includes a serial redirector.

FIG. 1 is a block diagram of an example of a communications network incorporating a gateway device that includes a serial redirector. The system comprises a plurality of first peers 114. In the example shown in FIG. 1, the first peers 114 include an application 114a (e.g., client application, hosted application), a computing device 114b (e.g., PC, tablet computer, laptop computer), a mobile device 114c (e.g., smartphone, personal digital assistant), and a property management system 114d. First peers 114a, 114b, 114c, and 114d are provided as alternative examples and can be present or absent from specific implementations as well as configured similarly or differently. Also, in the example shown in FIG. 1, one instance of each first peer 114 is shown, however, multiple instances of one or more first peer devices 114 can be included without departing from the scope or spirit of the disclosure.

In FIG. 1, the first peers 114 communicate with a gateway device 117. The gateway device 117 is coupled with a network 130. The gateway device 117 can communicate via the network 130 with one or more second peers 120. In the example shown in FIG. 1, the second peers 120 include a hosted application 120a (e.g., web application), a computing device 120b (e.g., PC, tablet computer, laptop computer), a mobile device 120c (e.g., smartphone, personal digital assistant), a second network 120d (e.g., LAN, WAN, Internet, VPN), and a billing and content server 120e. Second peers 120a, 120b, 120c, 120d, and 120e are provided as alternative examples and can be present or absent from specific implementations as well as configured similarly or differently. Also, in the example shown in FIG. 1, one instance of each second peer 120 is shown, however, multiple instances of one or more second peer devices 120 can be included without departing from the scope or spirit of the disclosure.

According to the arrangement shown in FIG. 1, the first peers 114 are configured to communicate with one or more second peers 120 by transmitting data to the gateway device 117 which, in turn, is configured to transmit corresponding data to the second peers 120. In the implementation shown, a serial redirector 112 is included in the gateway device 117 to mediate the transmission between the first peers 114 and the second peers 120.

The second peers 120 can also communicate with one or more first peers 114 in a similar fashion. The second peers 120 are configured to transmit data to the gateway device 117, identifying a target first peer 114. For example, in a property management system, the second peer 120 can be a centralized reservation system and the first peer 114 can be the reservation application at a specific hotel property. In this example, the second peer 120 can determine the appropriate gateway device 117 for the specific hotel property and is configured to transmit a request to the selected gateway device 117. The gateway device 117 is configured to transmit corresponding data to the destination first peer 114 in communication with this gateway device 117. For example, the gateway device 117 can determine the destination first peer 114 based at least in part on the message received. A transmission pattern will be described further below in reference to FIG. 3.

Determining the destination first peer 114 can be accomplished through techniques such as a first peer identifier in the message or where the gateway device 117 is configured to redirect message types or messages matching certain regular expressions to specific first peers. In an implementation, the resolution of which first peer should receive a message can be performed by a device other than the gateway device 117. In this implementation, the gateway device 117 is configured to generate a datagram including information needed to determine the first peer 114 based at least in part on the received message. The gateway device 117 is configured to transmit this datagram to a lookup service. The gateway device 117 then receives a message identifying the appropriate destination first peer 114 for the message.

For ease of discussion, the gateway device 117 is described as a single device. However, the gateway device 117 can be a distributed collection of modules implementing various features of the gateway device 117 described. Furthermore, the gateway device 117 is described as being associated with a site and first peers at the site. However, it will be appreciated that a gateway device 117 is configured to service traffic to and from multiple sites, and, by extension, multiple first peers at the multiple sites.

In an implementation of the system, the gateway device 117 can be similar to that described in U.S. Pat. No. 6,130,892 or U.S. Pat. No. 7,554,995 (collectively referred to hereinafter as the Gateway Device References), the contents of which are incorporated herein by reference. Briefly, the gateway device 117 facilitates transparent computer access to the online services or networks, such that devices can access networks via the gateway device 117 regardless of their network configurations. The gateway device 117 can include a subscriber interface that can adapt to the computer of a user to facilitate communication between the computer and a network or other online service without requiring the computer to be reconfigured. In this regard, the subscriber interface of the gateway device 117 has the ability to recognize computers attempting to access a network, the location of computers attempting to access a network, the identity of users attempting to gain network access, and additional attributes, as discussed, for example, in the Gateway Device References.

For example, gateway devices can communicate with billing and content servers which can present customizable billing options and content pages for subscribers of the gateway device. With respect to content, billing and content servers can present different log-on screens and pricing to a subscriber based upon one or more attributes associated with the subscriber. For example, a billing and content server can present different log-on screens and pricing based upon the location from which the subscriber accesses the network. In this regard, a subscriber in a suite can be presented with a different log-on screen and pricing options than a subscriber in a regular room or a conference room. Additionally, billing and content servers present subscribers with customized web content based upon one or more attributes associated with the subscriber. By way of example, a billing and content server can customize the web content based upon the location from which the subscriber accesses the network. In this respect, different fire escape route maps are presented to the subscriber based upon the room location from which the subscriber accesses the network. Additionally, guests in suites can have access to different web content than subscribers residing in a standard room.

With respect to billing, billing and content servers can interface with a payment authorization server, such as a credit card authorization server or electronic payment service (e.g., PayPal) to payment information and authorization regarding the various subscribers. Depending upon the billing arrangement of a particular subscriber, the billing and content server can communicate directly with the payment authorization service to appropriately charge the subscriber's account for the various services that the subscriber accesses via the gateway device. In an implementation, the billing and content server can communicate via the gateway device with a network management system, such as the property management system of a hotel, to appropriately charge the subscriber's account for the various services that the subscriber accesses via the gateway device.

Billing and content servers can perform other functions, such as distributing email based upon mailing lists configured according to subscriber-specific information. Billing and content servers can maintain and update membership records, such as frequent users clubs or frequent visitors clubs.

As briefly mentioned above, gateway devices can communicate with a network management system, such as the property management system maintained by a hotel or the like. The functions performed by a network management system can vary based at least in part upon the installation or application. For example, hotel property management systems automate operations such as room reservations, room assignments, guest check-in, guest check-out, or other front desk activities. Furthermore, hotel property management systems maintain a log of telephone calls and telephone charges for each guest room, and can be in communication with the Internet to facilitate on-line reservations. As described in U.S. Pat. No. 6,636,894 and U.S. Pat. No. 6,868,399, gateway devices communicate with network management systems, such as in instances in which the subscriber's access to various networks or on-line services is to be charged to their account that can be administered by the network management system. The contents U.S. Pat. No. 6,636,894 and U.S. Pat. No. 6,868,399 are incorporated herein by reference.

In some implementations, upon requesting access to a particular computer system or on-line service, the gateway device determines if the subscriber is entitled to access the computer system, the level of access and/or the type of services to which the subscriber is entitled. In an implementation, the system includes an Authentication, Authorization, and Accounting (AAA) procedure that is described by U.S. patent application Ser. No. 09/458,602 entitled Systems and Methods for Authorizing, Authenticating and Accounting Users Having Transparent Computer Access to a Network Using a Gateway Device filed Dec. 8, 1999 and U.S. Pat. No. 7,194,554, the contents of each of which are incorporated herein by reference. An AAA server can include a database of subscriber records. The AAA Server and/or included database can be remote to the gateway device or can be incorporated into the physical embodiment housing the gateway device. As such, in instances in which the AAA server and/or database are remote to the gateway device, the gateway device can frequently communicate with the AAA server and/or database. In addition to the external devices described above with which the gateway device can communicate, gateway devices can also communicate with a wide variety of other external devices (e.g., computing devices, mobile devices, networked appliances, displays, tablet computers, smartphones).

As illustrated in FIG. 1, the system shown includes an access controller 116 coupled with and between the first peers 114 and the gateway device 117. The access controller 116 is configured to multiplex the signals received from the plurality of computers onto a link to the gateway device 117. Depending upon the medium by which the first peers 114 are coupled with the access controller 116, the access controller 116 is configured to operate in different modes. For example, the access controller 116 can be a digital subscriber line access multiplexer (DSLAM) for signals transmitted via regular telephone lines, a cable head end (e.g., Cable Modem Termination Shelf (CMTS)) for signals transmitted via coaxial cables, a wireless access point (WAP) for signals transmitted via a wireless network, an optical line terminator (OLT), a switch or the like.

The system can include one or more routers 118 and/or servers (not shown in FIG. 1). These elements are configured to control or direct traffic to and from a plurality of first peers 114 or second peers 120. While the system shown in FIG. 1 includes one router, the system can include a plurality of routers, switches, bridges, or the like. In an implementation, these network components are arranged in a hierarchical fashion. These network components are configured to route traffic to and from the first peers 114 and/or second peers 120. In an implementation including routers, the gateway device 117 establishes a link with one or more routers rather than directly communicating with the network 130. The routers, in turn, establish links via the network 130 to the servers of the second peers 120. It will be appreciated by one of ordinary skill in the art that one or more devices illustrated in FIG. 1 can be combinable. For example, although not shown, the router 118 can be located entirely within the gateway device 117. Furthermore, additional elements can be included in the computer system, such as elements disclosed in the Gateway Device References, or other networked elements.

As described above, the gateway device 117 is configured to communicate with a variety of external devices. For example, gateway devices can communicate with billing and/or content servers. Billing and content servers present customized billing options and content pages for every subscriber of a gateway device 117. As such, gateway devices 117 must communicate on a frequent basis with the billing and content server.

Figure 2A:
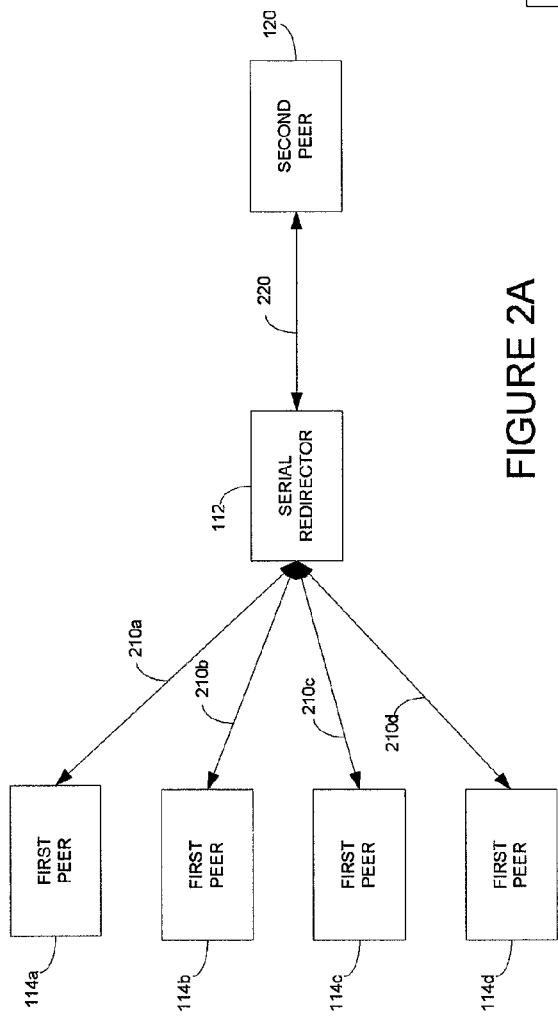
FIG. 2a is a block diagram illustrating an example connectivity configuration of a serial redirector.

FIG. 2a is a block diagram illustrating an example system connectivity configuration of a serial redirector. The system shown in FIG. 2a includes four first peer devices 114a, 114b, 114c, and 114d. Each first peer device 114a, 114b, 114c, and 114d communicates via connections 210a, 210b, 210c, and 210d, respectively, with the serial redirector 112. In an implementation the connections 210a, 210b, 210c, and 210d can be serial connections. The serial redirector 112 communicates via a connection 220 with the second peer 120. In an implementation the connection 220 can be a packet-based connection. In the example shown, multiple serial connections 210a, 210b, 210c, and 210d are redirected by the serial redirector 112 to a packet-based connection 220. Conversely, the single packet-based connection 220 can be used by the second peer 120 to communicate with the plurality of serially connected first peers 114a, 114b, 114c, and 114d. In some implementations, intermediate components, such as those shown in FIG. 1, can be included on communication paths 210 or 220. However, for clarity of discussion, these have been omitted from FIG. 2a. Furthermore, for ease of discussion, the serial redirector 112 is described as a single device. However, the serial redirector 112 can be a distributed collection of modules implementing various features of the serial redirector 112 described.

Figure 2B:
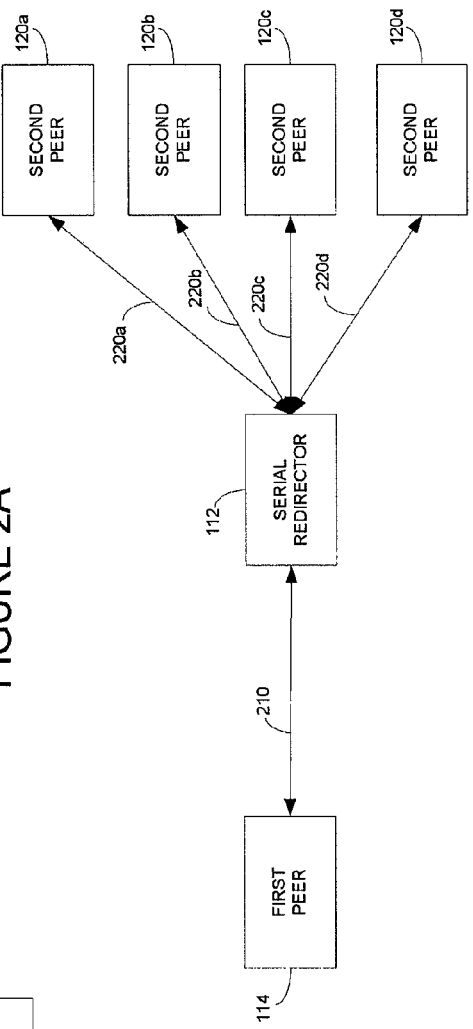
FIG. 2b is a block diagram illustrating an example connectivity configuration of a serial redirector.

FIG. 2b is a block diagram illustrating an example system connectivity configuration of a serial redirector. The system shown in FIG. 2b includes four second peer devices 120a, 120b, 120c, and 120d. Each second peer device 120a, 120b, 120c, and 120d communicates via connections 220a, 220b, 220c, and 220d, respectively, with the serial redirector 112. In an implementation the connections 220a, 220b, 220c, and 220d can be packet-based connections. The serial redirector 112 communicates via a connection 210 with the first peer 114. In an implementation the connection 210 can be a serial connection. In the example shown, multiple packet-based connections 220a, 220b, 220c, and 220d are redirected by the serial redirector 112 to the serial connection 210. Conversely, the serial connection 210 can be used by the first peer 114 to communicate with the plurality of serially connected second peers 120a, 120b, 120c, and 120d. In some implementations, intermediate components, such as those shown in FIG. 1, can be included on the communication path 210 or 220. However, for clarity of discussion, these have been omitted from FIG. 2b.

In an embodiment where multiple second peers transmit data for the same first peer, the serial redirector needs to manage the communication sessions to ensure the messages are properly routed and exchanged. This is because serial devices expect to only communicate with a single other device and are not equipped to handle multiple different peers. For example, in a situation where a second peer transmits a request to a first peer property management system requesting the status of a particular room while a subsequent message from another second peer transmits a request intended for the same first peer. The serial redirector can accept both messages and intelligently manage the transactions on behalf of the second peers. In an embodiment where the requests are distinguishable, the serial redirector can send both messages sequentially to the serial device and then when it receives the replies from the serial device, it can distinguish which reply to send to each second peer based on the original request associated with each second peer. This can be done by storing information about the request or the expected response along with the requesting peer in memory. Alternatively, depending on the capabilities of the serial device, the messages sent to and/or received from the serial device can indicate which peer is the appropriate peer. In an embodiment, the serial redirector can receive messages from multiple second peers and determine which first peer is the destination. In one implementation, the serial redirector determines that one transaction is quickly completed while the other transaction will include multiple back-and-forth messages. In this example, the serial redirector can be configured to process the quick transaction before processing the longer running transaction. In another implementation, transactions from certain second peers can be given a priority over transactions from other second peers. For example, a routine status check message can be preempted by a transaction initiated by security system. As noted above, this intelligent routing performed by the serial redirector can reduce integration costs between web-based second peers and serially connected first peers.

In an embodiment where the first peer initiates a communication, the serial redirector can be programmed with default second peer routing tables so that it know which second peer should receive that communication. These routing tables can be set up so that every time a certain type of communication is sent, it is forwarded to the same second peer. Alternatively, the serial redirector can intelligently determine which second peer should receive the communication based on a variety of factors including, the load or delay in communicating with the second peer, a preference order of second peers and/or which second peer typically requests the type of communication received from the first peer.

In one implementation, particularly but not limited to an implementation where the requests from the second peers are not distinguishable, the serial redirector can redirect the first request to the first peer and hold and/or reject the request from all subsequent second peers until the first transaction is completed. In the situation where a request is held, once a response to a previous request is received from the serial device, the second request can be sent to the serial device. In an alternative embodiment, if the requests are identical, the serial redirector can hold subsequent requests from second peers and when a response is received, the serial redirector can send the same response to multiple second peers without the need to re-request the same information from the serial device. In an implementation of a serial redirector, a second peer can communicate with a plurality of serially connected first peers without requiring an individual connection for each first peer. Accordingly, the number of connections opened and managed between the gateway device and the second peer are reduced. The methods and systems further allow existing serial devices to continue communicating with a packet-based second peer without requiring an update to existing serial communications or transaction patterns. As more second peers become available in the form of web-services or other software as a service implementations, a serial redirector so configured allows legacy serial devices to seamlessly communicate with newer packet-based services. This can be desirable in systems with an existing and widespread installation base featuring numerous serial peers because, for example, upgrading all the serial peers to communicate efficiently can be expensive and/or time consuming.

Figure 3:
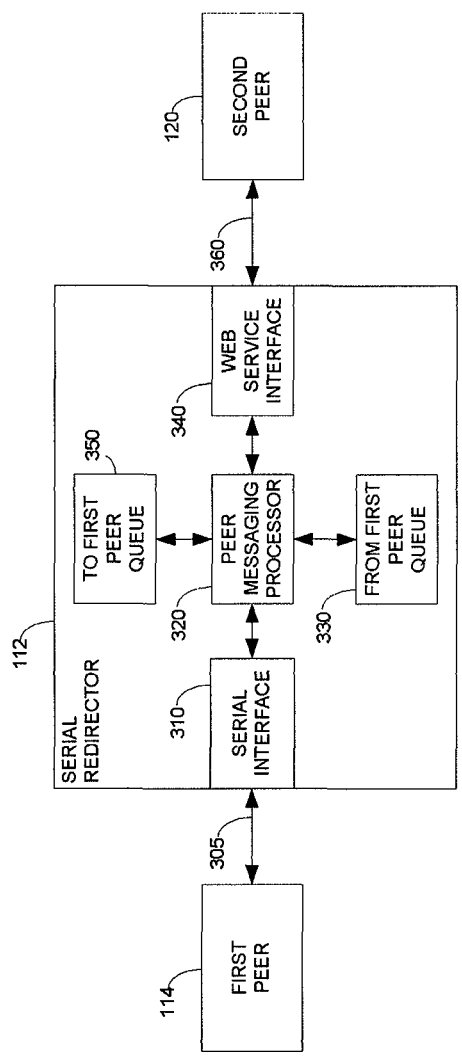
FIG. 3 is a block diagram illustrating an example of a serial redirector.

FIG. 3 is a block diagram illustrating an example of a serial redirector. The serial redirector 112 is in communication with the first peer 114 and the second peer 120. Between the second peer 120 and the serial redirector 112 is a communication link 360. For clarity of discussion, intermediary components (e.g., routers, networks, access controllers) that can be included between the serial redirector 112 and the second peer 120 have been omitted from this illustration. The second peer 120 is configured to transmit a message to the serial redirector 112 via the communication link 360. As shown, the communication link 360 terminates at a packet-based interface 340. In an implementation, the packet-based interface can include an ISO-OSI-inspired communication stack. An example, as shown in FIG. 3, of the packet-based interface 340 is a web service interface. In an implementation including a web service interface as the packet-based interface 340, the web service can be a SOAP interface, a REST-ful interface, XML-RPC, or a custom interface based on HTTP/HTTPS transport. The message can be formatted in a well-defined data-interchange format such as XML or javascript object notation. The packet-based interface 340 is configured to receive the incoming message from the second peer 120.

The packet-based interface 340 is coupled with a peer messaging processor 320. When the packet-based interface 340 receives a message, the packet-based interface 340 is configured to transmit the message to the peer messaging processor 320. The transmission from the packet-based interface 340 can be direct to the peer messaging processor 320 or via one or more intermediaries (e.g., encryption/decryption system, logging system, auditing system, networks, gateway devices).

In an implementation, the peer messaging processor 320 is configured to translate the incoming message. For example, in the case where the incoming message is an XML message, the peer messaging processor 320 can extract information from the XML message and generate one or more datagrams appropriate for communicating with the first peer 114 via a serial communication link 305. The peer messaging processor 320 can perform additional manipulation of the incoming message. For example, the peer messaging processor 320 can add time, date, source, or other message identification information to the message. Conversely, the peer messaging processor 320 is configured to remove information from the message. In an implementation, the peer messaging processor 320 is configured to translate all messages in the same way. In an implementation, the peer messaging processor 320 is configured to dynamically translate messages based at least in part on transaction specific information such as the first peer, the second peer, the site, the time or date of the message, the serial redirector status, gateway status if included within a gateway, or the system status.

In an implementation where the second peer communicates with a web service packet-based interface, the peer messaging processor 320 is configured to manage the state of the transaction using a session or transaction identifier. The identifier can be generated by the peer messaging processor or by another processing module (e.g., identifier generating web service; second peer). The identifier can include random elements. The identifier can include well-defined fields (e.g., second peer identification appears in certain location). In an example implementation where the identifier is not generated by the second peer, the identifier is transmitted to the second peer.

In a polling mode, the second peer can use the identifier to perform subsequent status checks on the transaction by providing at least the identifier. In a push mode where transaction messages are transmitted to the second peer when available, the second peer can use the identifier to sort incoming messages from the serial redirector and properly correlate the message with the second peer application initiating the transaction.

The peer messaging processor 320 is configured to control delivery of the message to the first peer 114 via a serial interface 310. As shown, the first peer 114 is in communication with the serial redirector 112 via the communication link 305. Communication link 305 is generally a local transport link such as RS232 or raw. TCP/IP. A local transport link may refer to transport links which may not be accessible from a public network. Examples of the control that the peer messaging processor 320 can be configured to perform include buffering message data and delivering after a configurable time passes, delivering message data once maximum data volume is reached, or delivering message data when a regular expression is matched against the received data. The peer messaging processor 320 can also implement quality of service features such as workload management amongst the first peers 114, service metering, failover forwarding, logging, or security.

The peer messaging processor 320 is configured to detect whether the first peer 114 is available for processing. In the case where the destination first peer 114 for the message is available, the peer messaging processor 320 can be configured to perform the message transformations and manipulations and send the result via the serial interface 310 to the first peer 114. In the implementation shown in FIG. 3, the message is transmitted from the peer messaging processor 320 to a to-first-peer queue 350. The to-first-peer queue 350 is a storage means for messages that are to be delivered to a first peer 114. A message can be placed in the to-first-peer queue 350 if the destination first peer 114 is unavailable (e.g., offline, in an error state). This situation is described further below in reference to FIG. 6. A message can be placed in the first peer queue 350 if the destination first peer 114 is currently processing. In an implementation, it can be desirable to place all messages into the to-first-peer queue 350 prior to delivery. The peer messaging processor 320 is further configured to retrieve messages from the to-first-peer queue 350 and deliver them as described above.

The peer messaging processor 320 is configured to communicate with a from-first-peer queue 330. The from-first-peer queue 330 generally serves a similar function as the to-first-peer queue 350 except the from-first-peer queue 330 is used for messages from the first peer 114 to the second peer 120. When this condition occurs, the serial redirector 112 is configured to encapsulate the buffered data received from the first peer in a data-interchange format (e.g., XML or JSON) and transmit the formatted data to the second peer 120. In an example implementation, delivery to the second peer 120 is via a web service interface (not shown) exposed by the second peer 120.

The above described configuration allows the second peer 120 to process incoming data in an on-demand fashion instead of having to monitor potentially thousands of active TCP/SCTP/IP connections even though there can be relatively little data arriving on each of the active sessions.

The to-first-peer queue 350 and from-first-peer queue 330 can be in memory queues. The queues can be physical memory queues. The queues can be hybrid queues configured to store some messages in memory and others to physical memory. For example, if a message has been in the queue for a certain period of time, it can be desirable to move this message to physical storage to enable messages for more active peers to be processed more efficiently.

The to-first-peer queue 350 or from-first-peer queue 330 can include a configurable to queuing scheme such as first in first out, first in last out, destination priority scheduling, source priority scheduling, or load scheduling. The queues can implement the queuing scheme. In some implementations, it can be desirable to implement the queuing scheme utilizing the peer message processor 320.

Figure 4:
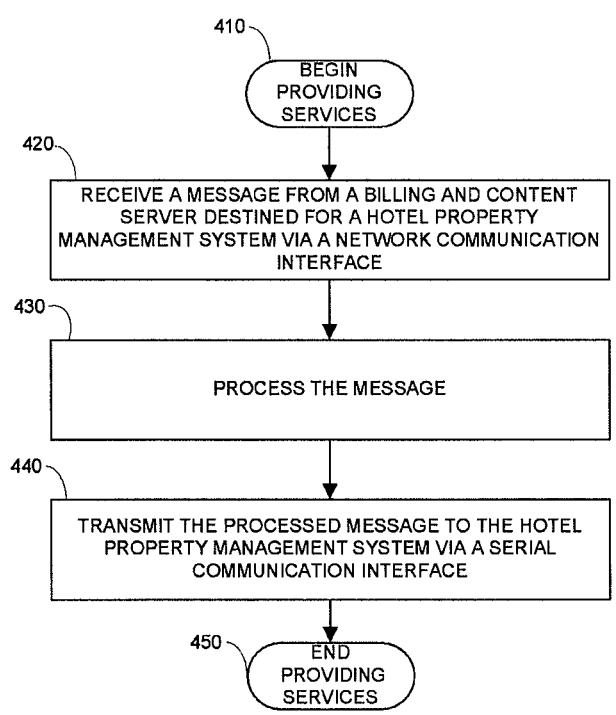
FIG. 4 illustrates a process diagram of an exemplary method for providing services.

FIG. 4 illustrates a process diagram of an exemplary method for providing services. At a block 410 the service provision begins. In the example implementation shown in FIG. 4, the service being provided is billing and content services for a hotel property management system. At a block 420, a message is received from a billing and content server. The intended message recipient is a hotel property management system. The message is received via a network communication interface such as a web service interface associated with the hotel property management system. At a block 430, the message is processed, for example, as described above. At a block 440, the processed message is transmitted to the hotel property management system via a serial communication interface such as RS232 or raw TCP/IP. At a block 450, the flow terminates.

Figure 5:
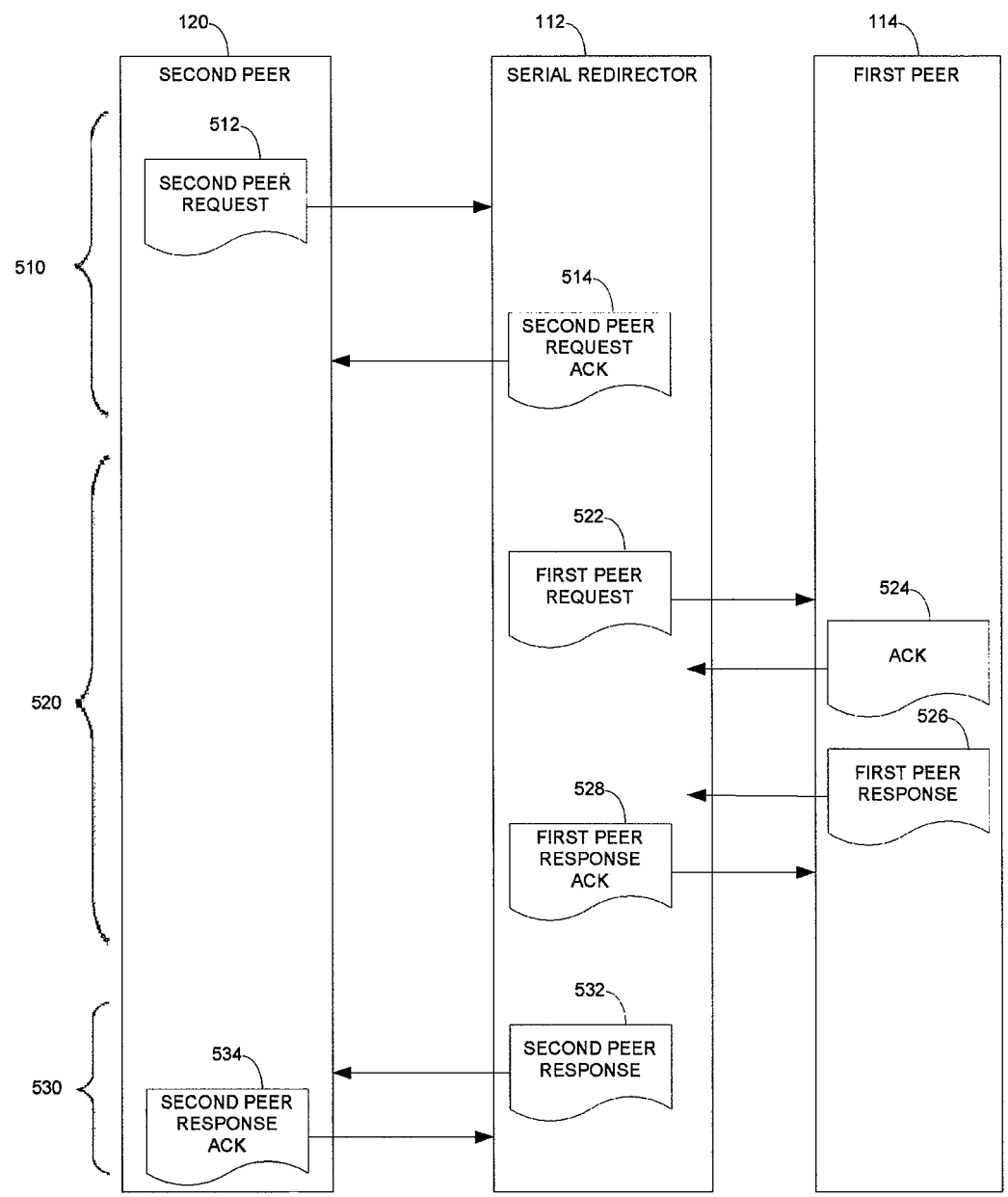
FIG. 5 illustrates an example message exchange session.

FIG. 5 illustrates an example message exchange session according to an implementation of the system. The message exchange session can generally be divided into three stages. The message exchange session starts with a queuing stage 510. During the queuing stage the second peer 120 is configured to transmit a second peer request message 512 to the serial redirector 112. While the second peer request message 512 is referred to as a "second peer" message, the ultimate intended recipient is the first peer 114. In the session shown, the serial redirector 112 queues the second peer request message 512 for example, as described above. Once successfully queued, the serial redirector 112 is configured to transmit a second peer request acknowledgment message 514 to the second peer 120.

In an exemplary implementation, the second peer request message 512 and the second peer request acknowledgement message 514 are exchanged using HTTP protocol during the queuing stage 510. In this example, the second peer request message 512 from the second peer 120 to the serial redirector 112 is transmitted using an HTTP POST. The second peer request acknowledgement message 514 provided by the serial redirector 112 can include an HTTP 201 OK response. As discussed above, for transactions that include state, the serial redirector can include a session or transaction identifier in second peer request acknowledgement message 514. Similarly, the second peer request message 514 can include a session or transaction identifier to transmit subsequent second peer request messages for a given transaction (e.g., transaction status request, provide additional input data). It will be appreciated that other message exchange protocols can be used (e.g., RPC).

In an exemplary implementation, the messages exchanged can be XML based messages. It will be appreciated that other formats such as text, comma separated values, fixed length fields, JSON, or binary object representations can be utilized.

After the queuing stage 510, the message exchange session continues to a processing stage 520. During the processing stage 520, the serial redirector 112 is configured to generate one or more messages based at least in part on the message received during the queuing stage 510. In the example shown in FIG. 5, the generated message is shown as a first peer request 522. The first peer request 522 is transmitted, for example by a peer message processor via a serial interface, to the first peer 114. The messages transmitted during the processing stage 520 can be formatted to facilitate transmission over a serial communication path. In the example shown in FIG. 5, the first peer 114 is configured to transmit an acknowledgement message 524 acknowledging receipt of the first peer request 522. In this example, the first peer 114 is configured to transmit a first peer response 526 to the serial redirector 112. The serial redirector 112 is configured to transmit a first peer response acknowledgement message 528 to the first peer 114.

After the processing stage 520, the message exchange session concludes with a responding stage 530. During the responding stage 530, the serial redirector 112 is configured to generate one or more messages based at least in part on the messages received during the processing stage 520. In the example shown, a second peer response message 532 is generated by the serial redirector 112 based at least in part on information from the first peer response 526. The second peer response message 532 is then transmitted to the second peer 120. In the example shown, the second peer 120 is configured to transmit a second peer response acknowledgement 534 to the serial redirector 112. As with the queuing stage 510, HTTP and XML are used to exchange the messages during the responding stage 530, but other protocols and formats can be utilized as described above.

Figure 6:
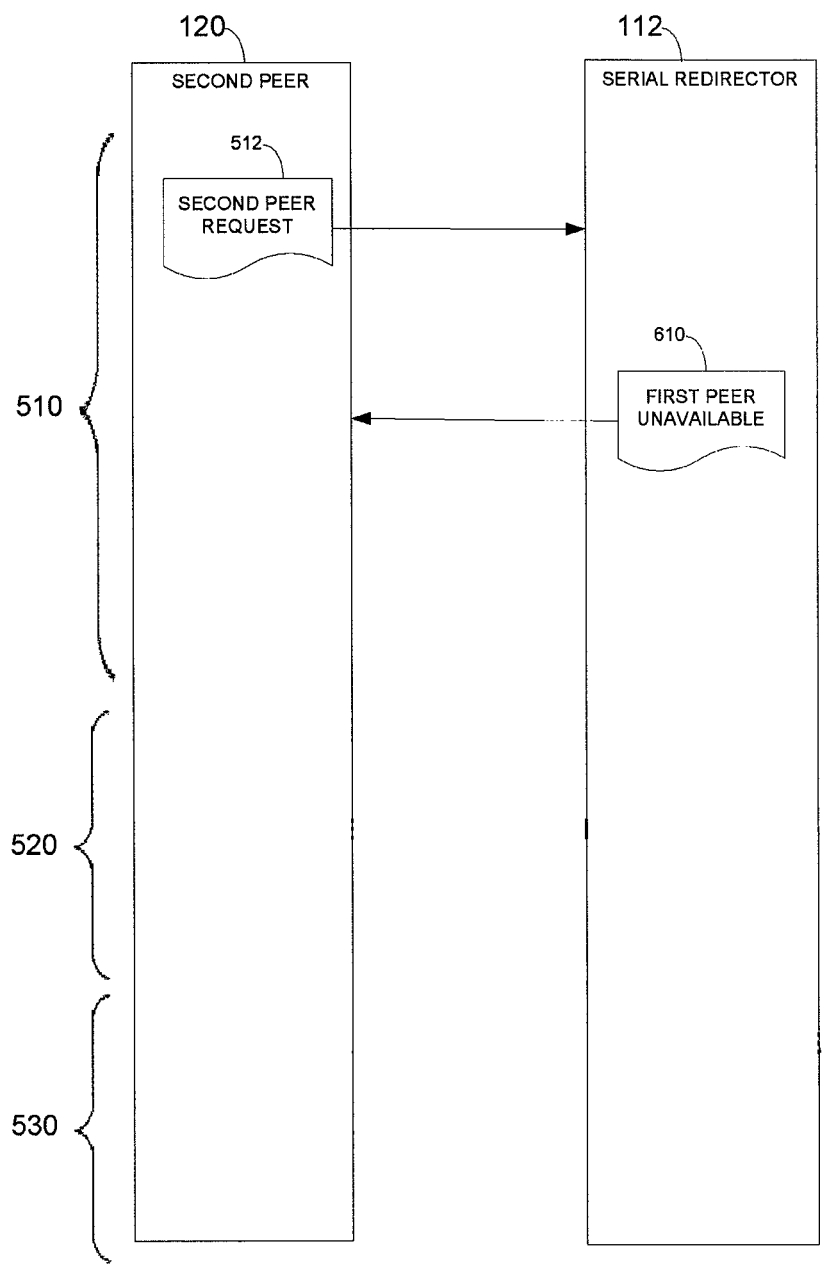
FIG. 6 illustrates an example message exchange session where the first peer is unavailable.

FIG. 6 illustrates an example message exchange session where the first peer is unavailable according to an implementation of the system. The message exchange session shown in FIG. 6 is similar to the message exchange session described in FIG. 5 above. However, in FIG. 6, the first peer 114 is unavailable. During the queuing stage 510, the second peer 120 sends the second peer request message 512 to the serial redirector 112. The serial redirector 112, upon determining the first peer 114 is unavailable, is configured to transmit a first peer unavailable message 610 indicating the same to the second peer 120. As shown, the second peer request message 512 is queued in a to-first-peer queue as described above for processing at a later time when the first peer 114 becomes available. For example, in one implementation the serial redirector 112 uses a heartbeat to determine the state of each connected first peer 114. If a first peer 114 does not respond to the heartbeat, the serial redirector 112 identifies this first peer 114 as unavailable. Upon subsequent heartbeat checks, the first peer 114 can respond thereby indicating to the serial redirector 112 that the first peer 114 is once again available for message processing. In this example, the processing stage 520 is deferred until the first peer 114 becomes available. Accordingly, the responding stage 530 is also deferred until the transaction is processed. Other methods for determining whether a first peer 114 is available can be included such as direct status notification from the first peer 114, first peer status lookup (e.g., direct lookup from persistent storage such as a database; indirect lookup via a system monitoring service), or schedule based determination.

Figure 7:
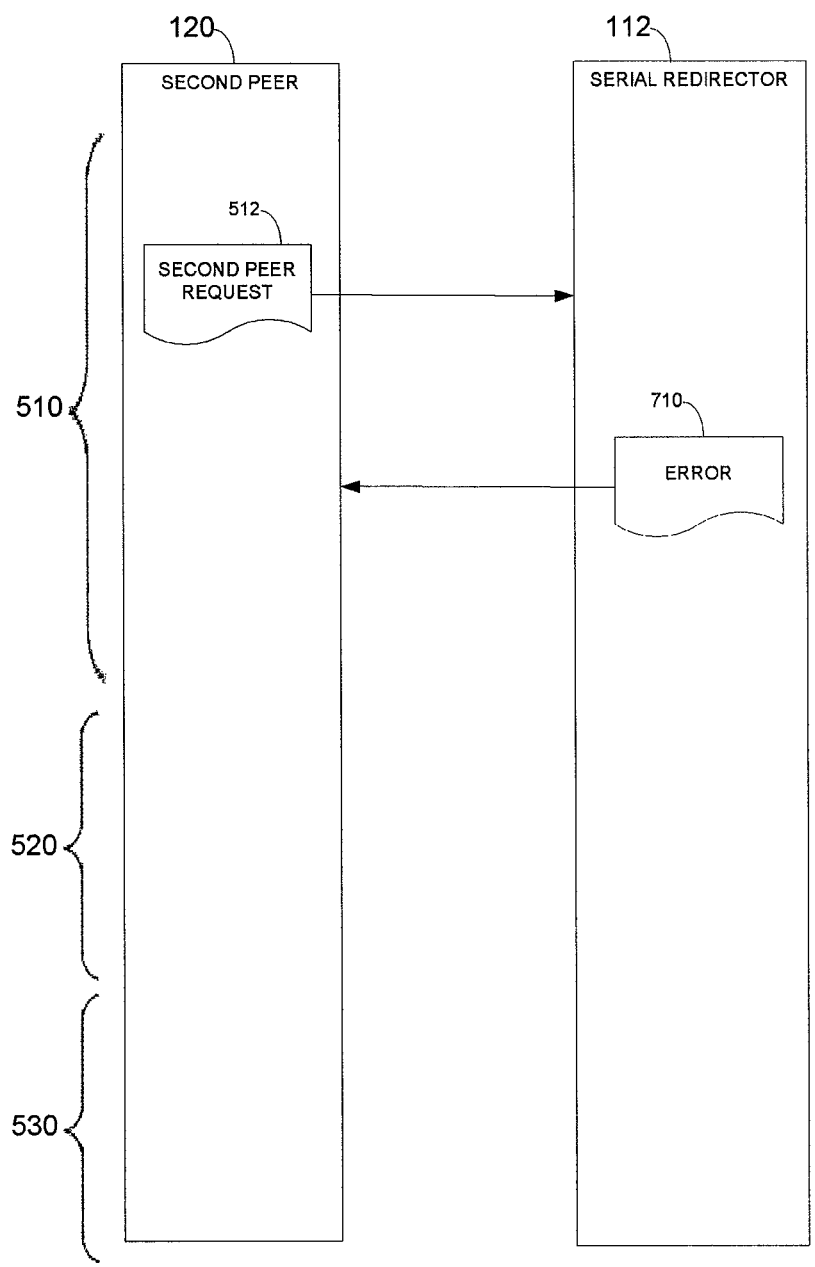
FIG. 7 illustrates an example message exchange session where the message queue is full.

FIG. 7 illustrates an example message exchange session where the message queue is full according to an implementation of the system. In certain implementations, a queue (e.g., to-first-peer queue, from-first-peer queue) included in the serial redirector 112 can fill to capacity. The situation illustrated in FIG. 7 can arise where the queues included in the serial redirector 112 reach a global maximum number of messages queued (e.g., several first peers unavailable or high system volume period). The situation illustrated in FIG. 7 can arise when a queue for a specific first peer reaches a local maximum number of messages queued (e.g., prolonged downtime for the first peer or high first peer volume period). The message exchange session shown in FIG. 7 is similar to the message exchange session described in FIGS. 4 and 5 above. However, in FIG. 7, unlike in FIG. 6, the second peer request message 512 is not queued. Instead, the serial redirector 112 is configured to respond to the second peer request message 512 received from the second peer 120 with an error message 710. In an implementation using HTTP transport, the error message 710 is transmitted to include an appropriate response status such as an HTTP 500 response. In this implementation, the processing stage 520 and the responding stage 530 are not performed under these conditions.

FIGS. 4, 5, and 6 describe example message exchange sessions wherein the message originated with a second peer and is targeted for a first peer. Similar message exchange sessions can be used for communications originating with a first peer and targeted for a second peer.

Table 1 illustrates an example of URI resource addressing and use of HTTP which may be used to examine/manipulate the serial redirector resources (e.g., transactionRequests and completedTransactions). In some implementations, modification of some resources may not be allowed. As such, the HTTP "PUT" method may not be supported and therefore not included in the following table. However, in some implementations, the resources may be remotely modified and may provide a corresponding "PUT" method including one or more aspects described above. Table 1 may be used to implement a REST-ful web service interface to the serial redirector.

TABLE 1

| Resource | GET | POST | DELETE |
|---|---|---|---|
| http://<address>/serialRedirector/v1/<transactionRequest> | Retrieve the XML representation of all transactionRequests. The representations are returned in the body of the response. | Create a new transactionRequest based upon the XML representation contained in the body of the request. The XML response contains an updated representation of the transactionRequest (e.g., the URI of the newly created transactionRequest is included in the representation) | Delete all transaction Requests |
| http://<address>/serialRedirector/v1/<transactionRequest>/<job id> | Retrieve the XML representation of a specific transactionRequests. The representation is returned in the body of the response. | Same as GET | Delete a specific transaction Request |
| http://<address>/serialRedirector/v1<completedTransaction> | Retrieve the XML representation of all completedTransactions The representations may be returned in the body of the response. | Same as GET | Delete completed transactions |
| http://<address>/serialRedirector/v1/<completedTransaction>/<job id> | Retrieve the XML representation of a specific completedTransaction. The representation may be returned in the body of the response. | Same as GET | Delete a specific completed transaction |

As discussed above, additionally or alternatively to the serial connection, a TCP connection may be used to communicate with the first peer 114. In such implementations, a streaming connection may be provided to the first peer 114. The actual data that may be sent over TCP may be the same as described above. TCP protocol may include features such as acknowledgement and checksums. Accordingly, TCP may be desirable for some implementations as the protocol may obviate the need for explicit actions to achieve these capabilities. Thus, the systems and methods described above may be applicable, whether the redirector first peer interface is configured to implement one or more of RS232, TCP, SCTP, UDP, Apple Talk, Bluetooth, X10 or other communication protocol. For example, the handling of messages and message queues may be performed as described above independent of the first peer communication protocol.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web-site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Thus, certain aspects can comprise a computer program product for performing the operations presented herein. For example, such a computer program product can comprise a computer readable medium having instructions stored (and/or encoded) thereon, the instructions being executable by one or more processors to perform the operations described herein. For certain aspects, the computer program product can include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc, or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the disclosure.

While the foregoing is directed to aspects of the present disclosure, other and further aspects of the disclosure can be devised without departing from the basic scope thereof.

What is claimed is:

1. A serial redirector device comprising:
   a serial communication interface providing one or more serial connections;
   a packet-based network communication interface in communication with a network providing one or more connections to the network; and
   a message processing circuit coupled with the serial communication interface and the packet-based network communication interface, the message processing circuit comprising:
   a message queue; and
   a message processor configured to redirect messages between a first device coupled with the serial communication interface and a second device coupled with the packet-based network communication interface, said redirecting comprising:
   identifying a location in the message queue based at least in part on a characteristic of the serially connected peer or the second peer; and
   storing a message in the identified location.

2. The device of claim 1, wherein the serial communication interface is configured for RS232 communication.

3. The device of claim 1, wherein the packet-based network communication interface is configured for transmission control protocol/internet protocol (TCP/IP) communication.

4. The device of claim 1, wherein the message processing circuit is further configured to redirect messages between a third device coupled with another serial communication interface and the second device.

5. The device of claim 4, wherein a message associated with the third device and a message associated with the first device are concurrently processed.

6. The device of claim 1, wherein the characteristic includes one or more of a load value, an operational status, a status of the associated communication interface, an associated configuration value.

7. The device of claim 1, wherein the message processing circuit is configured to identify a location in the message queue to store the message based at least in part on the characteristic of the first device or second device.

8. The device of claim 1, wherein the message queue comprises:
   a to-first-device message queue configured to store messages transmitted to the first device; and
   a from-first-device message queue configured to store messages transmitted from the first device.

9. A method of providing services, the method performed at a gateway device, the gateway device in communication with a serially connected peer and a second peer connected via a packet-based interface, the method comprising:
   receiving a message from the second peer destined for the serially connected peer via the packet-based interface;
   processing the message for serial transmission, said processing including:
   identifying a location in the message queue based at least in part on a characteristic of the serially connected peer or the second peer; and
   storing the message in the identified location; and
   transmitting the processed message to the serially connected peer via a serial communication interface.

10. The method of claim 9, wherein the serially connected peer is configured for RS232 communication.

11. The device of claim 9, wherein the packet-based interface is configured for transmission control protocol/internet protocol (TCP/IP) communication.

12. The method of claim 9, further comprising receiving a message from a third peer via the packet-based interface, the message from the third peer destine for the serially connected peer.

13. The method of claim 12, wherein a message associated with the second peer and a message associated with the third peer are concurrently processed.

14. The method of claim 9, wherein the characteristic includes one or more of a load value, an operational status of the peer, a status of the associated communication interface, an associated configuration value.

15. The method of claim 9, wherein processing the message comprises:
   extracting a value from the received message; and
   generating a serial message including the extracted value.

16. The method of claim 9, further comprising:
receiving a second message from serially connected peer destined for the second peer via the serial communication interface;
processing the second message for packet-based transmission; and
transmitting the processed second message to the second peer via the packet-based interface.

17. The method of claim 9, wherein the second peer includes a billing and content server, and wherein the serially connected peer includes a hotel property management system.

18. The method of claim 9, wherein the serially connected peer includes a billing and content server, and wherein the second peer includes a hotel property management system.

19. A method of redirecting a packet-based communication, the method comprising:
receiving the packet-based communication on a first interface;
queuing the packet-based communication in a queue, said queuing including:
identifying a location in the queue based at least in part on a characteristic of the packet-based communication; and
storing the packet-based communication in the identified location;
processing the packet-based communication for transmission via a second interface; and
transmitting the processed packet-based communication via the second interface.

20. The method of claim 19, wherein the second interface is configured for at least one of transmission control protocol (TCP), streams based TCP (SCTP), user datagram protocol (UDP), Apple Talk, Bluetooth, and X10 communication.

21. The method of claim 19, further comprising:
receiving a response to the processed packet-based communication via the first interface;
queuing the response;
processing the response for packet-based transmission; and
transmitting the processed response via the packet-based interface.

22. A non-transitory computer readable storage medium comprising instructions executable by a processor of an apparatus which cause the apparatus to:
receive, via a packet-based interface, a message from a peer device, the message destined for a serially connected peer device;
process the message for serial transmission, said processing including:
identifying a location in a message queue based at least in part on a characteristic of the serially connected peer or the peer device; and
storing the message in the identified location; and
transmit the processed message to the serially connected peer device via a serial communication interface.

* * * * *

UNITED STATES PATENT AND TRADEMARK OFFICE
CERTIFICATE OF CORRECTION

PATENT NO.        : 8,804,717 B2
APPLICATION NO.   : 13/481060
DATED             : August 12, 2014
INVENTOR(S)       : Vadim Olshansky Page 1 of 1

It is certified that error appears in the above-identified patent and that said Letters Patent is hereby corrected as shown below:

In the Claims

In column 16 at line 50, In Claim 11, change "device" to --method--.

Signed and Sealed this
Seventeenth Day of March, 2015

Michelle K. Lee
*Director of the United States Patent and Trademark Office*